United States Patent [19]

Heilemann

[11] 3,990,245

[45] Nov. 9, 1976

[54] ENERGY CONVERTER DEVICE

[76] Inventor: Volkmar Heilemann, 127 Mountainview Road, Warren Township, N.J. 07060

[22] Filed: Jan. 30, 1976

[21] Appl. No.: 654,029

[52] U.S. Cl. ................................... 60/671; 60/657
[51] Int. Cl.² ......................................... F01K 25/10
[58] Field of Search .............. 60/655, 651, 671, 657

[56] References Cited
UNITED STATES PATENTS
1,874,620   8/1932   Radford ............................... 60/655

*Primary Examiner*—Allen M. Ostrager

[57] ABSTRACT

In a preferred embodiment, an electrically driven fan blows ambient temperature-air across heat exchanger heat-exchanging tubes for the taking of heat from the air into gaseous freon 12 which warmed gas is thereafter further heated by heat of compression when passed through a compressor pump, another part of the combination, the total heat of which is heat-exchanged in isolated (separated) heat exchange relationship with another closed cycle of freon 11 in a condenser boiler adapted to vaporize the freon 11 which is channeled to a gas turbine drivably connected to an electric generator for the generation of electricity, the extraneous and/or waste heat energy emanating from around the turbine being collected by a heat exchanger and coolant thereof which turbine coolant is, in the heated state, channeled to another heat exchanger tubing in separate closed cycle, over which tubing the fan also blows to both cool the heated turbine coolant and the thereby warmed air thereafter striking the freon 12-containing heat-exchanging tubes to thereby enhance the beginning of a second and repeat cycle of continuing operation.

10 Claims, 1 Drawing Figure

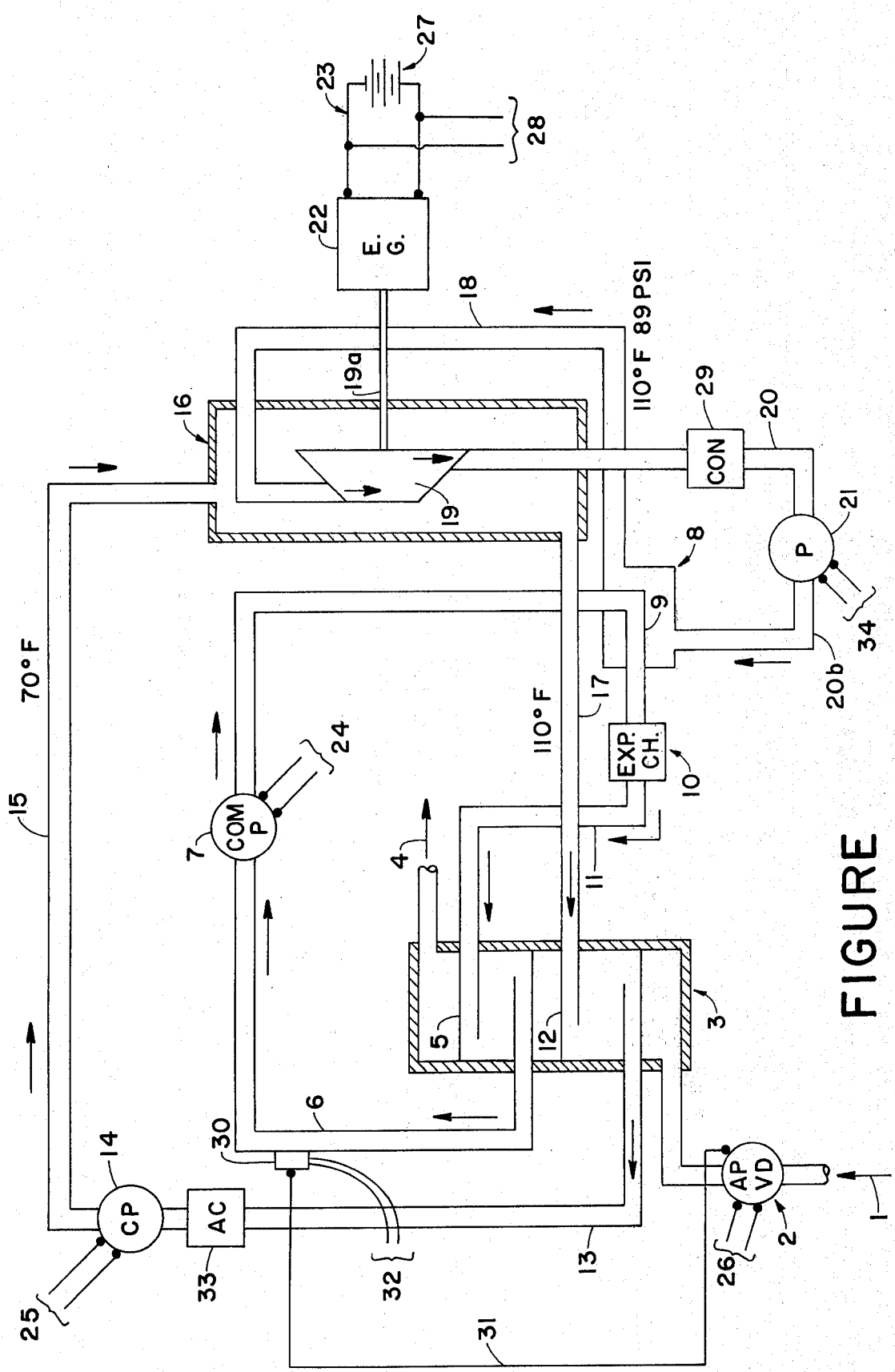
FIGURE

3,990,245

ENERGY CONVERTER DEVICE

This invention relates to a novel apparatus and mechanism for the conversion of naturally-occurring heat energy at ambient temperature into utilizable mechanical and/or electrical energy.

BACKGROUND TO THE INVENTION

Prior to the present invention, the energy crisis has become notorious in the present and future lack of adequate source(s) and productivity of oil, gasoline, electricity from hydro and other sources, and the lack, together with the present and future anti-business effect on economies of various nations and the individuals thereof, and together with the ever-increasing burdens of greater expense of available energy and increased inflation, together with the present degree and future potential remaining degree of dependence of this nation upon foreign resources.

Heretofore, there have not been any practical and operational substitutes for the conventional power sources of the types discussed above, and development by industry and science have given no great promise of suitable and/or adequate substitutes.

Obviously such substitute and new source of energy or new mechanism of efficiently utilizing existing naturally-occurring and readily available energy is highly desirous, and if such were made available, many if not all of the problems noted above would be overcome and/or eliminated substantially.

SUMMARY OF THE INVENTION

Accordingly, objects of the present invention include the obtaining of such device and mechanism and process thereof as to utilize readily available naturally-occurring energy in a practical and economical manner, on a scale readily available to persons of all economic levels throughout the world. It is conceivable that such adequate power could be a valuable tool in achieving more adequate productivity and higher standards of living in areas throughout the world, as well as in space.

Other objects become apparent from the preceding and following disclosure.

One or more objects of the invention are obtained by the device and process of the invention as illustrated by typical but not exclusive examples described herein.

Broadly the invention may be defined as an energy converter device to convert heat energy of one substance at a first temperature (ambient temperature) to mechanical energy and then to electrical energy, typically by a conventional mechanically driven generator. To understand the operation we will assume a 70° Fahrenheit air temperature as an example. We will use a heat-absorbing first heat exchanger to remove heat from the air by utilizng typically a conventional refrigeration compressor system or alternatively an equivalent refrigeration absorption system, both intended for purposes of this invention to be considered to be within the claim language of "compressor means". The refrigeration compressor system is preferred and believed to be more efficient and practical for this invention; accordingly, the illustrated system is limited to this preferred system. In a computation of energy input in terms of watts of electrical energy, the invention may be best understood, it is believed. Accordingly, through 1000 W (watts) of electrical compressor or absorption energy-input, there is absorbed 2500 W, of heat energy. Heat of absorption and heat of compression are rejected as heat of rejection on the hot side of the compressor, totaling in BTUs equivalent to approximately at least about 3500 W, at a temperature of 110–120 F (or at a temperature otherwise as may result from engineering to operate at a higher or lower air temperature, as the case may be). I use this heat of rejection to vaporize a low boiling-point fluid such as preferably freon 11, for example when the compressed refrigerant gas is freon 12, but for colder environmental air a freon 22 possibly being preferred and the condenser boiler liquid in such case being preferably freon 21. The vaporized freon 11 has a vapor pressure of 27.89 PSI/Absolute (A) at 110° Fahrenheit (F) and 13.345 PSI at 70° F; when this is run through a gas turbine (expansion-gas turbine), mechanical energy is thereby obtained. Such modern gas-expansion turbine works at an approximately 85% efficiency ratio. Cooling fluid for the turbine is circulated in a closed cycle to be fed to a third heat-emitting heat exchanger in operative heating relationship with the first heat exchanger to thereby heat fluid of the first heat exchanger. As the third heat exchanger heats the first heat exchanger to a temperature higher than 70° F, the efficiency of the compressor increases, resulting in a high output of electrical energy from the electrical generator, up to a point representing about theoretical maximum compressor efficiency. Heat energy of cool 70° F air permits the air to absorb the high heat energy of the turbine's rejected heat (turbine extraneous and/or waste heat) to be carried-away by the air to the extent that the heated air does not, as pre-heated air, heat the freon 12 of the first heat exchanger, thereby the rejected heat from the turbine enhancing the next-occurring heating of the initial state of freon 12 to be thereafter compressed in the continuing repeating cycles.

To calculate net output, I assume a 1 KW (kilowatt) unit. Other sizes will be proportionately equal or equivalent to the altered engineering.

| | |
|---|---|
| Heat of absorption (expressed in terms of watts) | 2500W |
| Heat of compression (expressed in terms of watts) | 1000W |
| Heat of rejection (expressed in terms of watts) | 3500W |
| Gross turbine output | 85% efficiency 2975W |
| Loss through boiler feed pump (in terms of watts) | 725W |
| Loss through condenser (in terms of watts) | 30W |
| Loss through blower motor (in terms of watts) | 50W |
| Loss through compressor (in terms of watts) | 1000W |

For the above computations, all pumps are driven by direct drive from the turbine. Net output figured on a most conservative basis is 1170 W (in terms of watts). Electrical output at generator efficiency is 1053 watts. An operational model will be considerably higher.

It should be further noted that the above computations are based on present production models and are certified by the National Bureau of Standards, such models being available from stock.

Efficiency may be further improved by building the unit device of this invention in a manner which benefits from gravity feed, and so eliminating boiler feed pump and amounting to an efficiency increase of 68%. The heat exchanger can be located in moving air or water and thus eliminate condenser pump and blower motor. If heat exchangers are located on a boat, there will be thereby provided considerable and plentiful moving water.

Utilizing the energy converter of this invention, there are no detrimental environmental impacts, no pollution nor use of fossil fuel, aside from lubricants. Cost arises solely from labor of building and maintenance and construction material and repair materials when needed. By installing heat absorbing exchanger in a building, air conditioning will be a no-cost by product of the device. Waste heat can then, when used as an air conditioner, be rejected in a different location or otherwise utilized.

DETAILED DESCRIPTION

The FIGURE illustrates the embodiment most preferred, in diagrammatic and schematic fashion, showing some parts in general cross-section to improve illustration of mechanism of operation.

In greater detail, the FIGURE illustrates an energy converter device which is a unique combination of well known parts of which individual functions are well known, but which combination obtains a unique effect of, in combination in a specified arrangement, extracting heat from environmental air in a sufficient quantity as to have an excess of net utilizable energy left over. It must be clearly stated for the benefit of those that might not be well versed in engineering, that this combination is not and does not purport to be a perpetual motion machine. However, what is in fact, is a combination which siphons heat energy from ambient or whatever warm or hot air might exist, and converts that heat energy to utilizable mechanical energy, utilizing as a part of the mechanism the heat of compression as well as reusing what might in many situations go as waste or extraneous heat energy. Accordingly, just as — for example — a clock which works on changes in barometric pressure and/or on changes in temperature, or as thermometers in the expansion of substance to give an indicated reading responsive to temperature, or a pressure causes readings of a barometer to change, such is in fact work energy put to work and derived from environmental conditions. In like manner, the present unique combination of components functioning as an operational unit functions with improved efficiency such that the heat energy is converted to a degree exceeding the energy requirement bringing about the conversion, such as for example a hydro-electric plant which by the electroturbines thereof converts the energy of flowing or falling water into a great excess of electrical energy to light the cities and country-side.

This unique combination converter device in its broadest aspects includes a first heat exchange construction designed to extract heat energy from an environmental medium such as water or air, for example, and a first gaseous heat transfer medium such as typically freon 12, or freon 22 for a colder climate or conditions, is circulated in closed cycle through the first heat exchange construction, adapted for increasing temperature of the first gaseous heat transfer medium during the extracting of heat energy as occurs when air is blown over the first heat exchange construction; thereafter, the heated first gaseous heat transfer medium such as heated freon 12, is channelled to a compressor unit where heat of compression is added to the heated gas to thereby further heat it while concurrently increasing the pressure thereof; from here, the compressed and excessively heated gas passes to a second heat exchange unit such as a condenser boiler conventional to refrigerators for example, in which a major proportion of the heat energy of the excessively heated gas is exchanged (extracted) to a second heat transfer medium circulated in isolated heat-exchange relationship with the first heat exchanger's first gaseous heat transfer medium, whereby in a second closed cycle the second heat transfer medium such as freon 11, or freon 21 under colder atmospheric conditions, becomes vaporized in the condenser boiler and the vapors are passed to a gas-expansion turbine for the driving of an electric generator, such electrical generator however not being essential to the broadest aspect of the device which in the driving of the turbine generates (converts to) mechanical energy, by the driving of the drive shaft of the turbine; an expansion chamber in the first closed cycle, follows the condenser such that the first gaseous heat transfer medium depleted of its excess heat energy is permitted to expand to a low pressure gas which is thereafter channelled back to the first heat exchange means for beginning of a new cycle in a continuing continuous operation. For the turbine there is a coolant cycle in its own closed cycle in which suitable conventional coolant (heat transfer medium) is heated, preferably boiled, and passed to the heat-dissipation exchanger tubes which may be separate from or in combination with the first heat exchanger preferably, such that preferably the same circulation pump or blower blows typically the air first over the cooling heat-dissipation coils and thereafter over the heat-absorbing coils of the first heat exchanger whereby potentially at least a portion of the dissipating heat energy may be absorbed into the first heat transfer medium; however, there is an upper maximum limit to which the first heat transfer medium may or should be heated for continued improved efficiency and productivity of the heat converter device, because of the maximum efficiency limitations of the compressor of the first closed cycle and of the efficiency of the boiler system of the second closed cycle, and the like. Preferably the hot effluent from the turbine is passed through a condenser, from which the collected heat may, if desired, be used to preheat at some other point. There are pumps in each of the second and third closed cycles to facilitate circulation, unless required efficiency for a particular use does not require such, and/or unless the particular design allows for gravity feeds.

With reference to the FIGURE, the arrow 1 indicates a feed of preferably air from atmospheric air at normal atmospheric conditions, pumped by a variable speed blower 2, to a first heat exchanger construction 3 from which the air flow as indicated by arrow 4 to return to mix with other air of the atmosphere. When the air is blown to the first exchanger construction, heat energy of the air is transferred to a lower temperature gaseous freon 12 within heater tubes 5, the heated freon 12 being thereafter passed to a gas compressor 7 (compressor pump) from which the compressed gas is passed to the boiler 8 and through the closed cycle heat exchange tubes 9 thereof, from which the cooled freon at high pressure is channelled to the expansion chamber 10, and thereafter back to the beginning of the cycle by conduits 11 to the heat-absorbing tubes 5. The speed of the variable speed blower 2 determines the extent to which heat is absorbed from the air to the tubes 5, as well as the extent of absorption of heat energy by the air from the tubes 12. The hot turbine coolant is passed from the turbine 19 through the conduit 17 to the tubes 12 where heat energy is given-up to the air being blown over the tubes 12, and from the tubes 12 the coolant is channelled through the conduit 13 optionally through an air conditioning unit 33, onward to a condenser pump 14, onward through conduit 15 to the coolant jacket 16 in which the coolant cools the turbine 19 before again returning through the conduit 17. Freon 11 boiled in the boiler 8 passes in vapor form through conduit 18 into and driving the turbine 19, from which the turbine effluent goes optionally to a condenser 29, and onwardly to pump 21, to return by thus the conduits 20a and 20b to the boiler 8. Turbine 19 drives the drive shaft 19a, to propel the generator 22 (electric generator) which by leads 23 powers battery 27 and take-off leads 28.

Preferably there is a thermostat (or the like) 30 fed by its electrical leads 32, with a signal lead therefrom controlling the speed of operation of variable drive blower 2 automatically, which blower is powered by leads 26. Compressor pump 7 is powered by leads 24, and condenser pump 14 by leads 25, and pump 21 by leads 34.

About 2.5 KW (equivalent) of heat energy is absorbed as shown, at air temperature of 70° F. At least 1 KW of heat energy is added by the compressor pump. The boiled freon 11 vapor at 3.5 KW is at about 110° F. at about 27.89 PSI(Absolute), and turbine effluent freon 11 is at about 70° F and 13.345 PSI(Absolute). The Blower is about 50 (or less) watt motor, and the boiler feed pump motor is 725 (or less) watts (power demand), and the condenser pump of the turbine coolant cycle, is 165 GPH at 30 (or less) watts. Efficiency of the turbine is 85%. The electrical generator output is 2.975 KW, at a generator efficiency of 90 percent, giving a net electrical energy excess (above converter demands) of at least 1.05 KW. Waste turbine-heat coolant is at 110° F, returned at 70° F.

It is within the scope of the present invention to make such variations and modifications and substitution of equivalents as would be apparent to a person of ordinary skill. For example, in substitute for the illustrated first heat exchanger construction, there may be substituted (as an equivalent) any other suitable structure for channeling heat into the freon 12 (for example) so long as the overall function is to gain heat from the natural environment or from even an unnatural environment — as a waste heat from some other source. In like manner, and often very beneficially the air may be replaced by water, particularly flowing water. Obviously solar cells may be utilized as a mechanism for collecting the initial heat.

I claim:

1. An energy converter device comprising in combination: a first heat exchange means for extracting heat energy from an environmental medium and a first gaseous heat transfer medium circulated in first closed cycle through the first heat exchange means, adapted for increasing temperature of the first gaseous heat transfer medium during the extracting heat energy; compressor means for receiving and adapted to receive said first gaseous heat transfer medium in a heated state from said first heat exchange means, and for compressing said first gaseous heat transfer medium to a compressed hot first heat transfer medium; a second heat exchange means for extracting heat energy from said compressed hot first heat transfer medium and connected within said first closed cycle to receive said compressed hot first heat transfer medium from said compressor means, and a second heat transfer medium circulated in second closed cycle through said second heat exchange means in isolated heat exchange relationship with said compressed hot first heat transfer medium, and the second heat exchange means being adapted for said second heat transfer medium to receive sufficient heat from the compressed hot first heat transfer medium for driving a turbine; a turbine means for receiving and connected to receive the second heat transfer medium in a heated state from said second heat exchange means, and for thereby driving a shaft; an expansion chamber means for receiving outlet gas from and connected to said second heat exchange means, and for providing gaseous expansion to a lower pressure state, within said first closed cycle, and connected to and for conducting expanded gas to said first heat exchange means; said turbine means being connected to said second heat exchange means, adapted for feeding effluent from said turbine means to said second heat exchange means within said second closed cycle; and turbine cooling means for extraction of extraneous and waste heat energy from the turbine means and for transmitting collected extraneous and waste heat energy to said first heat exchange means, in a third closed cycle, and a third heat exchange medium within said third closed cycle in isolated heat exchange relationship with environmental heat transfer medium circulated as a part of said first heat exchange means.

2. An energy converter device of claim 1, in which said compressor means comprises a compression pump, and in which said second heat exchange means comprises a condenser boiler.

3. An energy converter device of claim 2, including a condenser pump connected within said third closed cycle adapted to receive said third heat exchange medium from said first heat exchange means and to feed compressed-said third heat exchange medium to said turbine cooling means.

4. An energy converter device of claim 3, in which said environmental heat transfer medium is air and said first heat exchange means includes a fan adapted to cause said air to flow in heat exchange isolated relationship with said first gaseous heat transfer media and with said third heat exchange medium.

5. An energy converter device of claim 4, including an electrical generator means for generating electricity, and for and connected to said turbine means, to a drive shaft of the turbine means.

6. An energy converter device of claim 5, including a turbine effluent condenser in said second closed cycle connected to receive effluent from said turbine means and to feed said second heat exchange means.

7. An energy converter device of claim 6, in which within the second closed cycle there is a pump connected between said turbine effluent condenser and said second heat exchange means, adapted to pump condensed turbine effluent to the second heat exchange means.

8. An energy converter device of claim 3, including a variable drive blower connected to feed said air in heat exchange relationship with said first closed cycle at said first heat exchange means.

9. An energy converter device of claim 8, including an electrical generator means for generating electricity, and for and connected to said turbine means, to a drive shaft of the turbine means for the driving thereof.

10. An energy converter device of claim 9, including a thermostat means for measuring temperature of said first gaseous heat transfer medium and responsive to preset predetermined sensed temperature for automatically controlling speed of variable drive of said variable drive blower whereby temperature of said first gaseous heat transfer medium is controllable within a predetermined range.

* * * * *